United States Patent
Zhao et al.

(10) Patent No.: US 12,513,663 B2
(45) Date of Patent: Dec. 30, 2025

(54) METHOD AND DEVICE FOR RESOURCE SELECTION, AND STORAGE MEDIUM

(71) Applicant: BEIJING XIAOMI MOBILE SOFTWARE CO., LTD., Beijing (CN)

(72) Inventors: Wensu Zhao, Beijing (CN); Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 367 days.

(21) Appl. No.: 18/032,027

(22) PCT Filed: Oct. 14, 2020

(86) PCT No.: PCT/CN2020/120915
§ 371 (c)(1),
(2) Date: Apr. 14, 2023

(87) PCT Pub. No.: WO2022/077275
PCT Pub. Date: Apr. 21, 2022

(65) Prior Publication Data
US 2023/0413234 A1 Dec. 21, 2023

(51) Int. Cl.
*H04W 72/02* (2009.01)
*H04W 72/044* (2023.01)

(52) U.S. Cl.
CPC ......... *H04W 72/02* (2013.01); *H04W 72/044* (2013.01)

(58) Field of Classification Search
CPC .......................... H04W 72/02; H04W 72/044
See application file for complete search history.

(56) References Cited

U.S. PATENT DOCUMENTS

2022/0303952 A1* 9/2022 Hoang ................. H04L 5/0005

FOREIGN PATENT DOCUMENTS

| CN | 104869527 A | 8/2015 |
|---|---|---|
| CN | 110958586 A | 4/2020 |
| CN | 111246483 A | 6/2020 |

OTHER PUBLICATIONS

PCT/CN2020/120915, English translation of Search Report dated Jul. 20, 2021, 2 pages.
CATT "Discussion on feasibility and benefits for mode 2 enhancements" 3GPP TSG RAN WG1 meeting #102; R1-2005692; Aug. 2020; 4 pages.
Fraunhofer HHI "Designs for NR V2X Mode 2 Resource Allocation" 3GPP TSG RAN WG1 Meeting AH1901, R1-1900356, Jan. 2019, 12 pages.
OPPO "Inter-UE coordination in mode 2 of NR sidelink" 3GPP TSG RAN WG1 #102-e, R1-2006011, Aug. 2020, 3 pages.
Chinese Patent Application No. 202080002792.X, First Office Action dated Oct. 14, 2022, 7 pages.

(Continued)

*Primary Examiner* — Won Tae C Kim
(74) *Attorney, Agent, or Firm* — Cozen O'Connor

(57) ABSTRACT

A method for resource selection, performed by a first device, includes: determining an assistance resource set provided by a second device, the assistance resource set comprising a preferred resource set to be used by the first device or a non-preferred resource set to be used by the first device; and determining a first candidate resource set for transmission resource selection based on the assistance resource set.

10 Claims, 8 Drawing Sheets

```
                                                                    S11
┌──────────────────────────────────────────────────────┐
│ determining an assistance resource set provided by    │
│ a second device, the assistance resource set          │
│ comprising preferred resources to be used by the      │
│ first device or non-preferred resources to be used    │
│ by the first device                                   │
└──────────────────────────────────────────────────────┘
                           │
                           ▼                            S12
┌──────────────────────────────────────────────────────┐
│ determining a first candidate resource set for        │
│ transmission resource selection based on the          │
│ assistance resource set                               │
└──────────────────────────────────────────────────────┘
```

(56) References Cited

OTHER PUBLICATIONS

Chinese Patent Application No. 202080002792.X, English translation of First Office Action dated May 19, 2023, 6 pages.
Chinese Patent Application No. 202080002792.X, Second Office Action dated May 19, 2023, 8 pages.
Chinese Patent Application No. 202080002792.X, English translation of Second Office Action dated Aug. 20, 2024, 10 pages.
Intel Corporation "On Feasibility and Benefits of Sidelink Enhancements Targeting Mode 2 Reliability and Latency", 3GPP TSG RAN WG1 Meeting #102-E, R1-2005897, Aug. 2020, 7 pages.
Chinese Patent Application No. 202080002792.X, English translation of First Office Action dated Oct. 14, 2022, 7 pages.
Chinese Patent Application No. 202080002792.X, Second Office Action dated May 19, 2023, 6 pages.
Chinese Patent Application No. 202080002792.X, English translation of Second Office Action dated May 19, 2023, 8 pages.

European Patent Application No. 20957056.3, Search and Opinion Nov. 8, 2023, 18 pages.
Intel Corporation "Solutions to Remaining Opens of Resource Allocation Mode-2 for NRV2X Sidelink Design" 3GPP TSG RAN WG1 #100bis-E, R1-2001994, Apr. 2020, 21 pages.
CATT "Remaining issues on Mode 2 resource allocation in NR V2X" 3GPP TSG RAN WG1 #100bis e-Meeting, R1-2002078 Apr. 2020, 16 pages.
Intel Corporation "Remaining details of Mode-2 NR V2X sidelink design" 3GPP TSG RAN WG1 #101-E, R1-2003735, May/Jun. 2020, 11 pages.
Lenovo et al. "Sidelink resource allocation for Reliability enhancement" 3GPP TSG RAN WG1 #102-e, R1-2005840, Aug. 2020, 3 pages.
Ericsson "Feasibility and benefits of mode 2 enhancements for inter-UE coordination" 3GPP TSG RAN WG1 Meeting #102-e, R1-2006445, Aug. 2020, 7 pages.

* cited by examiner sending an assistance resource set, the assistance resource set comprising preferred resources to be used by the first device or non-preferred resources to be used by the first device — S21

METHOD AND DEVICE FOR RESOURCE SELECTION, AND STORAGE MEDIUM

CROSS-REFERENCE TO RELATED APPLICATION

This application is a national phase of International Application No. PCT/CN2020/120915, filed on Oct. 14, 2020, the entire content of which is incorporated herein by reference.

TECHNICAL FIELD

The disclosure relates to the field of communication technologies, and in particular, to a method for resource selection, a device for resource selection, and a storage medium.

BACKGROUND

With the development of long term evolution (LTE) wireless communication protocols, the third generation partnership (3GPP) is formulating a sidelink standard as a direct communication standard from one terminal to another terminal. A first standard of a new radio (NR) sidelink has been completed in release 16 since July 2020. A solution of the NR sidelink is mainly applied to vehicle to everything (V2X) and public security applications. For the V2X and public security, release 16 does not fully support service requirements and operating schemes due to time constraints, but service and system aspects (SA) are enhanced in release 17 NR Sidelink. For example, architecture enhancement and system enhancement for supporting advanced V2X services for the 3GPP has been added in release 17. In addition, other business cases related to the NR sidelink are being studied in an SA workgroup, such as a network-controlled interaction service, an enhanced energy efficiency relay, a wide coverage, and an audio-visual service production. Therefore, at the 86th session of 3GPP, in a release 17 program, enhancement of the NR sidelink is taken as a work program, to enhance the reliability of sidelink transmission and reduce the delay.

SUMMARY

According to a first aspect of the disclosure, a method for resource selection is provided. The method is applicable to a first device. The method includes: determining an assistance resource set provided by a second device, the assistance resource set including preferred resource set to be used by the first device or non-preferred resource set to be used by the first device; and determining a first candidate resource set for transmission resource selection based on the assistance resource set.

According to a second aspect of the disclosure, a method for resource selection is provided. The method is applicable to a second device. The method includes: sending an assistance resource set, the assistance resource set including preferred resource set to be used by the first device or non-preferred resource set to be used by the first device.

According to a third aspect of the disclosure, a device for resource selection is provided. The device includes: a processor; and a memory for storing instructions executable by the processor; in which the processor is configured to perform the method for resource selection as described in the first aspect.

According to a fourth aspect of the disclosure, a device for resource selection is provided. The device includes: a processor; and a memory for storing instructions executable by the processor; in which the processor is configured to perform the method for resource selection as described in the second aspect.

According to a fifth aspect of the disclosure, a non-transitory computer-readable storage medium is provided. When instructions in the storage medium are executed by a processor of a first device, the first device can perform the method for resource selection as described in the first aspect.

According to a sixth aspect of the disclosure, a non-transitory computer-readable storage medium is provided. When instructions in the storage medium are executed by a processor of a second device, the second device can perform the method for resource selection as described in the second aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

Figure 1:
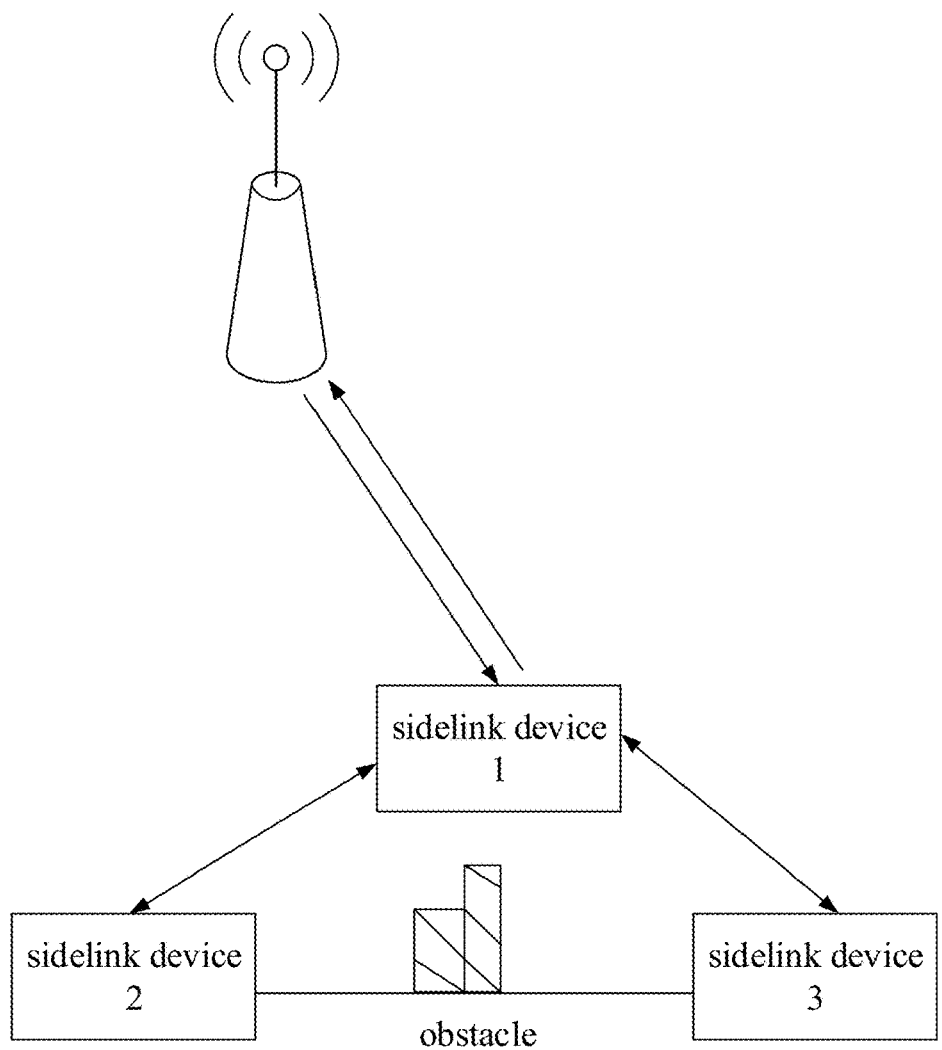
FIG. 1 is a schematic diagram of a communication system according to some embodiments.

A method for resource selection, provided in embodiments of the disclosure, is applicable to a sidelink system as illustrated in FIG. 1. As illustrated in FIG. 1, in a sidelink scenario among sidelink devices, a network device configures transmission parameters for data transmission for a sidelink device 1. Sidelink transmission is performed on a sidelink device 1, a sidelink device 2, and a sidelink device 3. There may be an obstacle between the sidelink device 2 and the sidelink device 3. Communication links between the network device and the sidelink device 1 are an uplink and a downlink. A link between a sidelink device and another sidelink device is a sidelink.

In the disclosure, a scenario of sidelink communication among sidelink devices may be a vehicle to everything (V2X) service scenario. V represents a vehicle-mounted device and X represents any object that interacts with the vehicle-mounted device. X mainly includes a vehicle-mounted device, a handheld device, a traffic side infrastructure, and a network. Information patterns of V2X interaction include vehicle to vehicle (V2V) interaction, vehicle to infrastructure (V2I) interaction, vehicle to pedestrian (V2P) interaction, and vehicle to network (V2N) interaction.

With the development of the new fifth generation (5G) mobile communication technology, a 5G NR technology is applied in a 3GPP release 16 to support new V2X communication services and scenarios, such as vehicles platooning, extended sensors, advanced driving, remote driving, and the like. In general, a 5G V2X sidelink may provide a higher communication rate, a shorter communication delay, and a more reliable communication quality.

A scenario of sidelink communication among sidelink devices also may be a device to device (D2D) communication scenario. In embodiments of the disclosure, the sidelink device for the sidelink communication may include various handheld devices, vehicle-mounted devices, wearable devices, and computing devices, which are with wireless communication functions, or other processing devices connected to wireless modems, as well as various forms of user equipments (UEs), mobile stations (MSs), terminals, terminal equipments, etc. For ease of description, in embodiments of the disclosure, it is illustrated by taking a sidelink device being a user equipment for an example.

The enhancement of the NR sidelink may improve transmission reliability and reduce delay. In the enhancement of the NR sidelink, a 3GPP work group has concluded that a method for assisting in resource selection between user equipments is required in enhancing a Mode2 resource allocation. Two user equipments are specified in the method. For example, a user equipment A is an assistance user equipment of a user equipment B, and the user equipment B refers to a user equipment that needs to select a resource for data that is to be sent by the user equipment B itself. The user equipment A may determine a resource set and sends the resource set to the user equipment B by means of a Mode2, and the user equipment B may consider the resource set sent by the user equipment A when selecting the resource(s). That is, it can be understood as the user equipment B uses an assistance resource assistance mechanism. The user equipment B may send data to the user equipment A and/or other user equipment.

However, in the related art, in a solution in which the user equipment B uses the assistance resource assistance mechanism, there are the following problems.

(1) The assistance resource set sent by the user equipment A to the user equipment B is not defined, and the process of resource selection by the user equipment B based on the assistance resource set is not described.

(2) After the user equipment B performs resource selection based on the assistance resource set sent by the user equipment A, the final candidate resource set determined may be an empty set or resources in the candidate resource set are reduced, which is not possible to ensure that rand resource selection requirements are satisfied in step2 of resource selection.

Some embodiments of the disclosure provide a method for resource selection. In the method for resource selection, the assistance resource set sent by the user equipment A to the user equipment B is defined, and the process of resource selection by the user equipment B based on the assistance resource set is described.

For convenience of description, in embodiments of the disclosure, the user equipment (the user equipment B) that performs resource selection based on the assistance resource set is referred to as the first device, and the user equipment (the user equipment A) that provides the assistance resource set is referred to as the second device.

Figure 2:
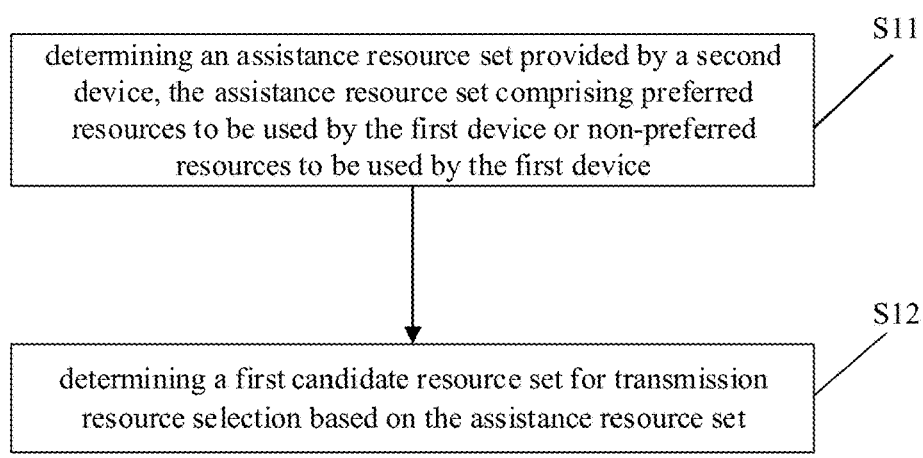
FIG. 2 is a flow chart of a method for resource selection according to a first device, in some embodiments.

FIG. 2 is a flow chart of a method for resource selection according to some embodiments. As illustrated in FIG. 2, the method for resource selection is applicable to the first device. The method includes the following steps.

In step S11, an assistance resource set provided by the second device is determined, in which the assistance resource set includes preferred resource set to be used by the first device or non-preferred resource set to be used by the first device.

In step S12, a first candidate resource set for transmission resource selection is determined based on the assistance resource set.

The first candidate resource set in embodiments of the disclosure may be understood as a final candidate resource set selected by the first device based on the assistance resource set.

The candidate resource set in embodiments of the disclosure may be understood as a resource set that can be used by the first device to send data.

In embodiments of the disclosure, the assistance resource set provided by the second device includes the preferred resource set to be used by the first device or the non-preferred resource set to be used by the first device, which realizes the definition of the assistance resource set.

Figures 3, 4:
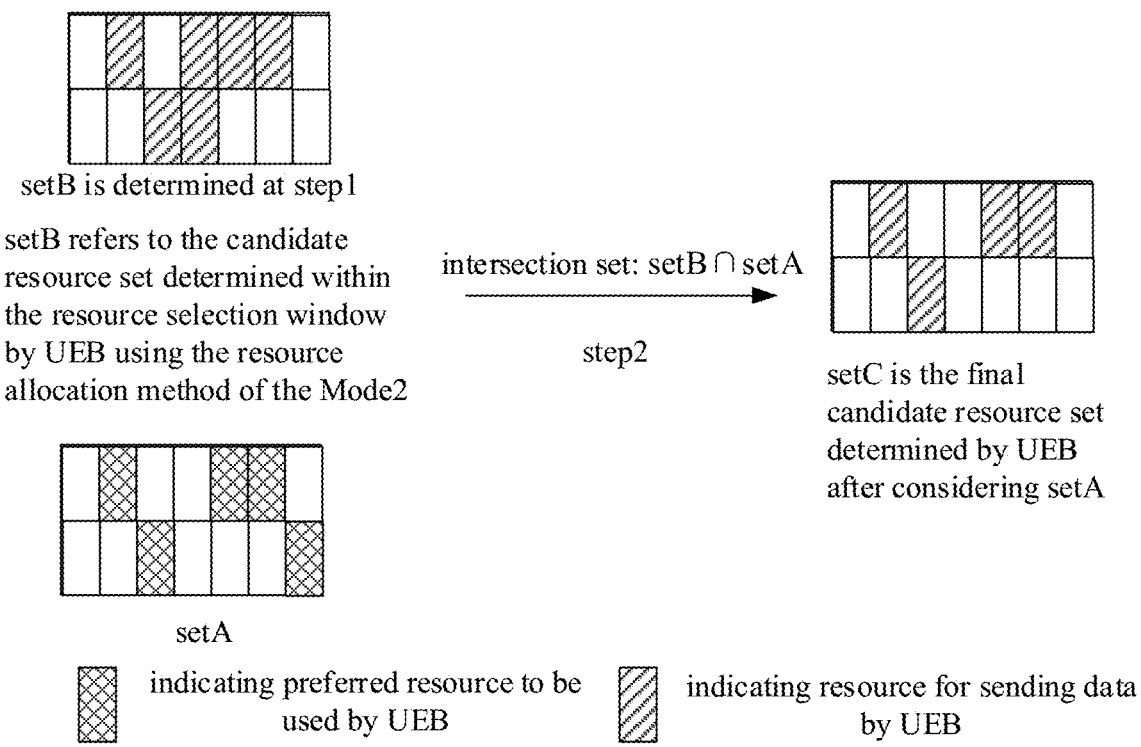
FIG. 3 is a flow chart of a method for resource selection according to a second device, in some embodiments.
FIG. 4 is a schematic diagram of a process for selecting a first candidate resource set according to some embodiments of the disclosure.

FIG. 3 is a flow chart of a method for resource selection according to some embodiments. As illustrated in FIG. 3, the method for resource selection is applicable to the second device. The method includes the following step.

In step S21, an assistance resource set is sent, in which the assistance resource set includes preferred resource set to be used by the first device or non-preferred resource set to be used by the first device.

In embodiments of the disclosure, the second device provides the assistance resource set and sends it to the first device. The first device receives the assistance resource set sent by the second device. The assistance resource set sent by the second device to the first device may be understood as a resource set sent in a 3GPP work item description (WID). In embodiments of the disclosure, the assistance resource set provided by the second device may have the following two definitions. One is that the assistance resource set sent by the second device to the first device is preferred resource set to be used by the first device. The other is that the assistance resource set sent by the second device to the first device is non-preferred resource set to be used by the first device.

In embodiments of the disclosure, when the first device determines the first candidate resource set based on the assistance resource set, it may select the first candidate resource set in different ways based on whether the assistance resource set includes preferred resource set or non-preferred resource set.

In some embodiments, the assistance resource set includes the preferred resource set to be used by the first device, and a set operation is performed on the assistance resource set and a candidate resource set to be selected for resource selection (hereinafter referred to as the second candidate resource set). For example, an intersection operation is performed on the second candidate resource set and the assistance resource set, and based on the intersection between the second candidate resource set and the assistance resource set, the first candidate resource set for transmission resource selection is determined.

In some embodiments, the assistance resource set includes the non-preferred resource set to be used by the first device, and a set operation is performed on the assistance resource set and a candidate resource set to be selected for resource selection (hereinafter referred to as the second candidate resource set). For example, a difference operation is performed on the second candidate resource set and the assistance resource set, and based on the difference between the second candidate resource set and the assistance resource set, the first candidate resource set for transmission resource selection is determined.

In the following embodiments of the disclosure, the process of selecting by the first device the first candidate resource set based on the assistance resource set will be described in combination with practical applications.

In the related art, the process of resource selection when the first device adopts the non-assistance resource assistance mechanism includes: step1, determining a candidate resource set in a resource selection window, and step2: randomly selecting resource(s) from the candidate resource set to send data.

In embodiments of the disclosure, the time to use the assistance resource assistance mechanism for resource selection may be after step1, that is, after the candidate resource set is determined within the resource selection window, it may consider using the assistance resource assistance mechanism for resource selection. In embodiments of the disclosure, the time to use the assistance resource assistance mechanism for resource selection may be before step1, that is, before the candidate resource set is determined within the resource selection window, it may consider using the assistance resource assistance mechanism for resource selection.

In embodiments of the disclosure, based on the time mode used by the above-mentioned assistance resource assistance mechanism, the second candidate resource set may be determined based on the resource selection process when the first device adopts the non-assistance resource assistance mechanism. In an example, in some embodiments of the disclosure, the second candidate resource set may be determined after step1. In some embodiments, the second candidate resource set is a candidate resource set determined within the resource selection window of the first device. In an example, in embodiments of the disclosure, the second candidate resource set may be determined before step1. In some embodiments, the second candidate resource set is all resources within the resource selection window of the first device.

In embodiments of the disclosure, after step1, when the second candidate resource set is determined, and when the second candidate resource set is the candidate resource set determined within the resource selection window of the first device, it may be that the assistance resource set provided by the second device and the second candidate resource set (the candidate resource set determined within the resource selection window) are subjected to a set operation, and the result of the set operation is determined as the first candidate resource set.

In an example, the assistance resource set provided by the second device includes the preferred resource set to be used by the first device, and the intersection of the assistance resource set provided by the second device and the second candidate resource set (the candidate resource set determined within the resource selection window) is obtained, and the intersection between the assistance resource set provided by the second device and the second candidate resource set (the candidate resource set determined within the resource selection window) is used as the first candidate resource set.

FIG. 4 is a schematic diagram of a process for selecting a first candidate resource set according to some embodiments of the disclosure. In FIG. 4, the first device is UEB and the second device is UEA. The assistance resource set provided by UEA is setA, namely, a resource set is determined at UE-A in the 3GPP WID. The assistance resource set setA may be sent by UEA to UEB. setB refers to the candidate resource set determined and sensed within the resource selection window by UEB using the resource allocation method of the Mode2, that is, decoding the sidelink control information (SCI) and the reference signal receiving power (RSRP) measurement of the demodulation reference signal (DMRS), that is, the second candidate resource set. setC is the final candidate resource set determined by UEB after considering setA, that is, the first candidate resource set.

The process that UEB uses the assistance resource assistance mechanism to select resource(s) may be as follows: after step1 of UEB is completed, that is, after the candidate resource set setB is determined, the assistance resource set setA sent by UEA is started to be considered. In the first step in FIG. 4, i.e., step1, UEB first perceives resources through the existing resource allocation method of the Mode2, and determines the candidate resource set setB by decoding the SCI and the RSRP measurement of the DMRS. In the second step, UEB starts to consider the assistance resource set sent by UEA. When setA is the preferred resource set, setA∩setB is performed, and after the intersection operation, setC is finally obtained for transmission resource selection.

In another example, the assistance resource set provided by the second device includes the non-preferred resource set to be used by the first device, and the difference of the assistance resource set provided by the second device and the second candidate resource set (the candidate resource set determined within the resource selection window) is obtained, and the difference between the assistance resource set provided by the second device and the second candidate resource set (the candidate resource set determined within the resource selection window) is used as the first candidate resource set.

Figure 5:
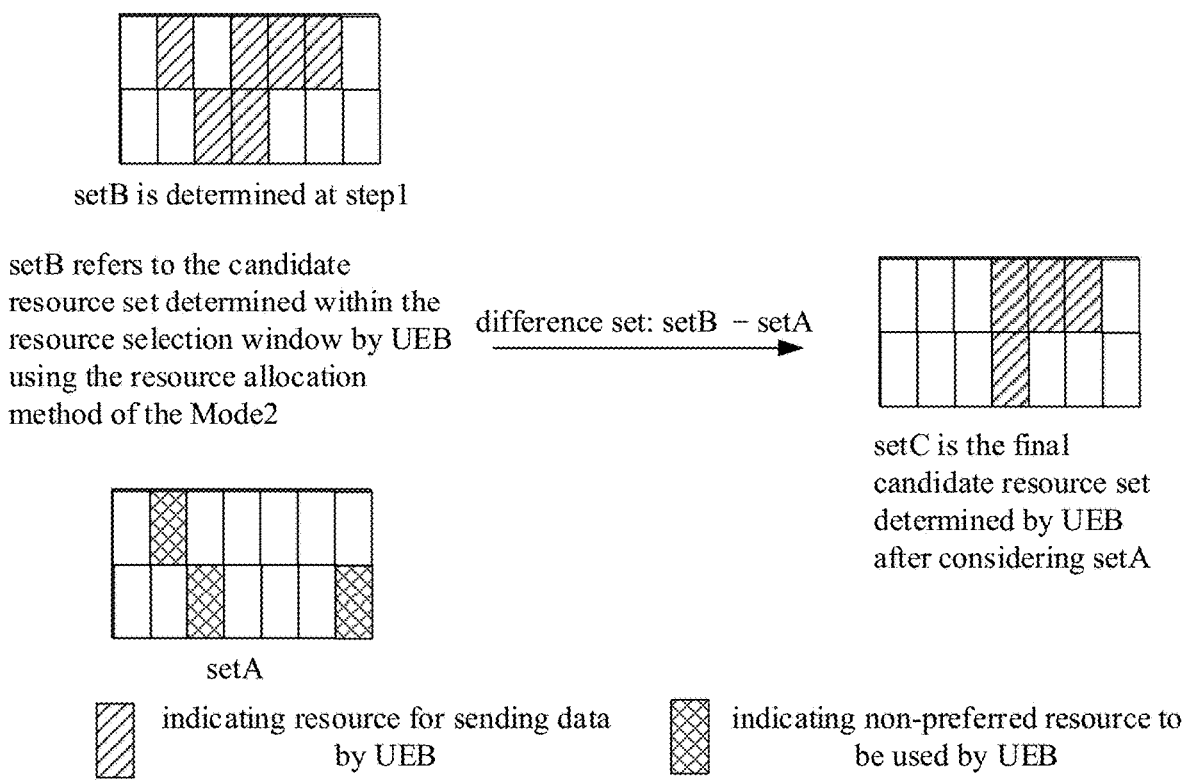
FIG. 5 is a schematic diagram of a process for selecting a first candidate resource set according to some embodiments of the disclosure.

FIG. 5 is a schematic diagram of a process for selecting a first candidate resource set according to some embodiments of the disclosure. In FIG. 5, the first device is UEB and the second device is UEA. UEA provides the assistance resource set setA. setB refers to the candidate resource set determined by UEB perceptually within the resource selection window, that is, the second candidate resource set. setC is the final candidate resource set determined by UEB after considering setA, that is, the first candidate resource set.

Referring to FIG. 5, the process that UEB uses the assistance resource assistance mechanism to select resource(s) may be as follows: after step1 of UEB is completed, that is, after the candidate resource set setB is determined, the assistance resource set setA sent by UEA is considered. In the first step in FIG. 4, i.e., step1, UEB first perceives resources through the existing resource allocation method of the Mode2, and determines the candidate resource set setB by decoding the SCI and the RSRP measurement of the DMRS. In the second step, UEB starts to consider the assistance resource set sent by UEA. When setA is the non-preferred resource set, the operation of setB-setA is performed, and setC, which is finally selected for transmission resource selection, is obtained after the set difference operation.

It can be understood that, in embodiments of the disclosure, when the second candidate resource set is determined within the resource selection window, resources in the first candidate resource set determined based on the intersection or difference processing of the second candidate resource set and the assistance resource set are reduced compared to resources determined by the conventional Mode2 method, and there may be an empty set. Referring to the example in FIG. 4, when setA is the preferred resource set, after the intersection, resources in setC are reduced relative to resources in the candidate resource set setB determined by UEB. At times, after setA n setB, setC may be an empty set. Referring to the example in FIG. 5, when setA is the non-preferred resource set, after the difference, resources in setC are reduced relative to resources in the candidate resource set setB determined by UEB. At times, after setB-setA, setC may be an empty set.

In the case where the first candidate resource set is an empty set in embodiments of the disclosure, in an implementation manner, transmission resource(s) may be selected from the second candidate resource set, that is, the first device uses resources perceived by itself to select resource(s). In another implementation manner, the first device abandons this data transmission, that is, cancels the transmission resource selection, and no longer selects resource(s) for this data transmission.

In embodiments of the disclosure, before step1, the second candidate resource set is determined. In the case that the second candidate resource set is all resources within the resource selection window of the first device, when selecting the first candidate resource set, the set operation is performed on the assistance resource set provided by the second device and the second candidate resource set (all resources within the resource selection window of the first device), and in the result of the set operation, resource selection is performed based on the conventional Mode2 to determine the final candidate resource set to obtain the first candidate resource set.

For example, when determining the first candidate resource set for transmission resource selection, if the assistance resource set provided by the second device includes the preferred resource set to be used by the first device, the intersection of the assistance resource set provided by the second device and the second candidate resource set (all resources within the resource selection window of the first device) is obtained. A third candidate resource set is determined based on the intersection, and the first candidate resource set is determined from the third candidate resource set. For example, the Mode2 is used to determine the first candidate resource set from the third candidate resource set. If the assistance resource set provided by the second device includes the non-preferred resource set to be used by the first device, the difference of the assistance resource set provided by the second device and the second candidate resource set (all resources within the resource selection window of the first device) is obtained, and the third candidate resource set is determined based on the difference, and the first candidate resource set is determined from the third candidate resource set. For example, the first candidate resource set is determined from the third candidate resource set in the Mode2.

Figure 6:
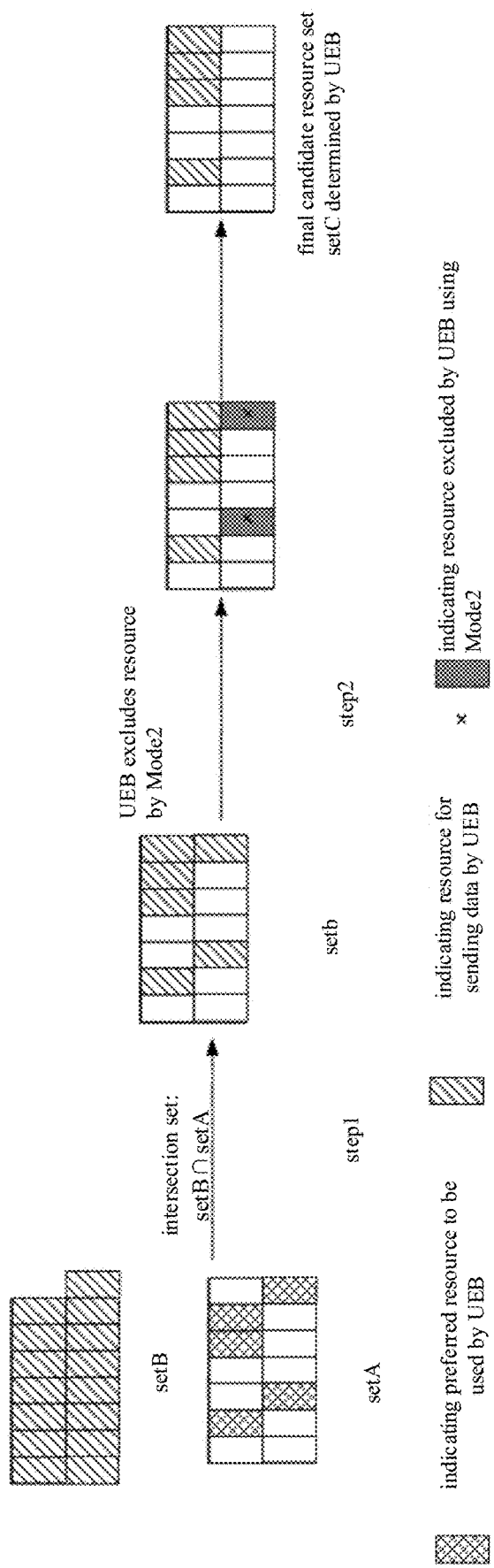
FIG. 6 is a schematic diagram of a process for selecting a first candidate resource set according to some embodiments of the disclosure.
Figure 7:
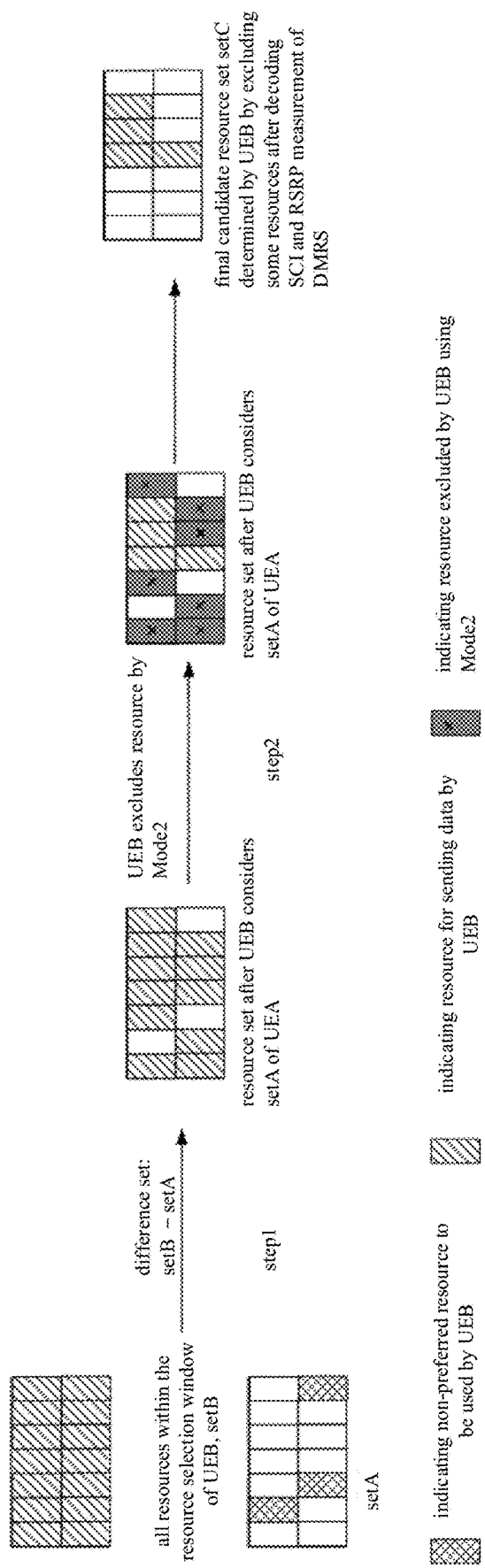
FIG. 7 is a schematic diagram of a process for selecting a first candidate resource set according to some embodiments of the disclosure.

FIG. 6 and FIG. 7 are schematic diagrams illustrating a process for selecting a first candidate resource set according to some embodiments of the disclosure. In FIG. 6 and FIG. 7, the first device is UEB and the second device is UEA. UEA provides the assistance resource set setA. In FIG. 6, before UEB performs step1 of resource selection, it starts to consider the setA sent by UEA. As illustrated in FIG. 6 and FIG. 7, the first step is to consider setA sent by UEA, and an intersection operation (in FIG. 6) is performed on setB and setA, or a difference operation (in FIG. 7) is performed on setB and setA. After the intersection and difference operations, a candidate resource set setB is determined, that is, the third candidate resource set. UEB then selects resources from the third candidate resource set setB in the Mode2, i.e., perceives resources by decoding the SCI and the RSRP measurement of the DMRS and determines the final set setC of candidate resources by excluding non-candidate resources in setB, that is, the first candidate resource set.

In the related art, when the first device adopts the Mode2 for resource selection under the non assistance resource assistance mechanism, and presets a specified ratio threshold for using the non assistance resource assistance mechanism, step1 follows the formula: x %=the candidate resource set/all resources within the resource selection window to calculate the ratio x % of the candidate resource set within the resource selection window, and it is judged whether the requirement that x % is greater than or equal to the specified ratio threshold is satisfied. If it is not satisfied, the threshold of the RSRP will be increased, and then it will be in the process of resource identification in step1 to identify more candidate resources until the requirement that x % is greater than or equal to the specified ratio threshold is satisfied, which ensures the rand resource selection requirement.

In embodiments of the disclosure, when the first device uses the Mode2 to select resources from the third candidate resource set, in order to ensure the rand resource selection requirement of the first device in step2 of resource selection, a ratio threshold for resource selection may be set independently for the assistance resource assistance mechanism among devices for the resource selection, hereinafter referred to as the first ratio threshold. The first ratio threshold is preconfigured through a radio resource control (RRC) signaling.

In embodiments of the disclosure, a ratio of the first candidate resource set to the third candidate resource set (the resource set after the intersection or difference operation on the assistance resource set provided by the second device and all the resources within the resource selection window of the first device) is greater than the first ratio threshold.

For example, x % is the actually determined ratio of candidate resources. See FIG. 6 and FIG. 7:

x %=resources in setC/candidate resource set setB after the intersection or difference operation is performed on setB and setA.

x %≥X %, and X % is the first ratio threshold.

In embodiments of the disclosure, the first device adopts the assistance resource assistance mechanism. Referring to FIG. 4 to FIG. 7, since the intersection or difference operation is performed on setB and setA, there is a case where resources in the final determined set setC of candidate resources are reduced. If step1 of resource selection in the Mode2 resource allocation is used to calculate the radio of candidate resources within the resource selection window, the rand resource selection requirement in step2 of resource selection may not be guaranteed. In fact, using the assistance resource assistance mechanism, in the case where the second candidate resource set is a candidate resource set determined within the resource selection window of the first device, and when the first candidate resource set (setC) is determined, there is no secondary process of judging whether X % is satisfied, and then the rand resource selection may not be guaranteed. In the case where the second candidate resource set is all resources within the resource selection window of the first device, and when determining the first candidate resource set, although x % will be judged again, the ratio of the candidate resource set is the ratio of the first candidate resource set to the third candidate resource set, which is relative to the third candidate resource set, not relative to all resources within the resource selection window. Therefore, even if the radio of the first candidate resource set and the third candidate resource set satisfies x %≥X %, the ratio of the first candidate resource set to all resources within the resource selection window may not satisfy x %≥X %, and the rand resource selection may not be guaranteed, either. Therefore, in the assistance resource selection, when the first device uses the assistance resource set provided by the second device, it is determined that the resources in the final candidate resource set (the first candidate resource set) are reduced, and the rand resource selection in step2 of the resource selection may not be guaranteed.

In embodiments of the disclosure, in order to solve this problem, for the assistance resource assistance mechanism in resource selection, a larger value of X % is configured through RRC, such as {30%, 45%, 60%}. The existing value of X % is {20%, 35%, 50%}. That is, the value of X % when the first device adopts the assistance resource assistance mechanism is different from the value of X % when the first device adopts the non-assistance resource assistance mechanism. If the assistance is requested when the first device selects resource(s), the value of X % under the assistance resource assistance mechanism will be used at this time, and if the assistance is not requested, the value of X % under the non-assistance resource assistance mechanism will be used.

Continuing to refer to FIG. 4 and FIG. 5, for the case where the second candidate resource set is a candidate resource set determined within the resource selection window of the first device, if a larger value of X % is preconfigured, SetB contains more resources, and it can also be guaranteed to a certain extent that after setB∩setA or setB-setA, there are enough resources in setC for rand resource selection. But there may still be a possibility that setC is an empty set, and in this case, UEB uses its own perceived setB. Continue to refer to FIG. 6 and FIG. 7, by pre-configuring a larger value of X %, this ensures that more resources are identified when the candidate resource set is identified in step2 of the resource awareness of UEB in FIG. 6 and FIG. 7. When setC is determined, the resources in setC can not only satisfy that the ratio of the first candidate resource set to the third candidate resource set is greater than the first ratio threshold, but also satisfy that the ratio of the first candidate resource set to all the resources within the resource selection window is greater than the first ratio threshold, which ensures that enough resources are used for rand resource selection. Therefore, configuring a larger value of X % under the assistance mechanism can solve the problem that rand resource selection may not be guaranteed after resource reduction.

The method for resource selection provided by embodiments of the disclosure proposes two definitions of the assistance resource set sent by the second device to the first device. The assistance resource set is preferred resource set to be used by the first device, or the assistance resource set is non-preferred resource set to be used by the device. Two solutions are proposed in which the first device considers the assistance resource set sent by the second device in the process of its own resource selection. There are the following two solutions.

(1) After step1 of the first device is completed, and after a candidate resource set is determined as the second candidate resource set, the assistance resource set sent by the second device is considered, and the second candidate resource set and the assistance resource set are aggregated.

(2) Before step1 of resource selection of the first device, the assistance resource set sent by the second device is considered, and all resources within the resource selection window are taken as the second candidate resource set, and the second candidate resource set and the assistance resource set are aggregated.

Further, embodiments of the disclosure propose the following two solutions for the situation that the first candidate resource set may be an empty set.

(1) The first device directly uses the candidate resource set (the second candidate resource set) determined by itself as the first candidate resource set.

(2) The first device abandons this data transmission and no longer determines resource(s) for this data transmission.

Further, in the method for resource selection provided in embodiments of the disclosure, for the problem that after the first device considers the resource set of the second device, the resources in the final candidate resource set are reduced, and the rand resource selection in step2 in the resource selection may not be guaranteed, the value of X % is set independently for the assistance resource assistance mechanism, that is, a larger value of X % under the assistance mechanism is pre-configured through the RRC.

Based on the same concept, some embodiments of the disclosure also provide an apparatus for resource selection.

It may be understood that, the apparatus for resource selection provided in embodiments of the disclosure includes hardware structures and/or software modules that perform corresponding functions in order to achieve the above functions. In combination with modules and algorithm steps of examples described in embodiments of the disclosure, embodiments of the disclosure may be implemented in a form of hardware or a combination of hardware and computer software. Whether a certain function is executed by hardware or computer software driving hardware depends on specific applications and design constraints of the technical solution. Those skilled in the art may adopt different manners for each specific application to implement the described functions, but such implementation should not be considered as beyond the scope of the technical solutions in embodiments of the disclosure.

Figure 8:
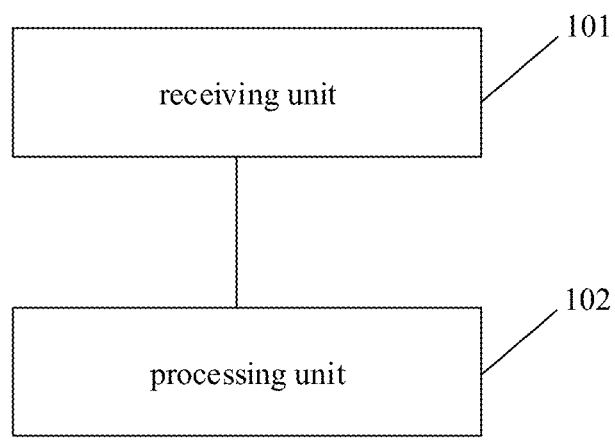
FIG. 8 is a block diagram of an apparatus for resource selection according to some embodiments.

FIG. 8 is a block diagram of an apparatus for resource selection according to some embodiments. Referring to FIG. 8, the apparatus 100 is applied to a first device and includes a receiving unit 101 and a processing unit 102.

The receiving unit 101 is configured to determine an assistance resource set provided by a second device, the assistance resource set including preferred resource set to be used by the first device or non-preferred resource set to be used by the first device. The processing unit 102 is configured to determine a first candidate resource set for transmission resource selection based on the assistance resource set.

In some embodiments, the assistance resource set includes the preferred resource set to be used by the first device, and the processing unit 102 is configured to: determine the first candidate resource set for transmission resource selection based on an intersection between a second candidate resource set and the assistance resource set.

In some embodiments, the assistance resource set includes the non-preferred resource set to be used by the first device, and the processing unit 102 is configured to: determine the first candidate resource set for transmission resource selection based on a difference between a second candidate resource set and the assistance resource set.

In some embodiments, the second candidate resource set includes a candidate resource set determined within a resource selection window of the first device.

In some embodiments, the first candidate resource set is the intersection between the second candidate resource set and the assistance resource set, or the first candidate resource set is the difference between the second candidate resource set and the assistance resource set.

In some embodiments, the second candidate resource set includes all resources within a resource selection window of the first device.

In some embodiments, the processing unit is configured to: determine a third candidate resource set in an intersection between the second candidate resource set and the assistance resource set, or determine a third candidate resource set in a difference between the second candidate resource set and the assistance resource set; and determine the first candidate resource set for transmission resource selection from the third candidate resource set.

In some embodiments, the processing unit 102 is configured to: select a resource for transmitting data from the first candidate resource set.

In some embodiments, the processing unit 102 is configured to: in response to the first candidate resource set being an empty set, select a transmission resource from the second candidate resource set or deselect a transmission resource and abandon a transmission of data.

In some embodiments, a ratio of the first candidate resource set to all resources within the resource selection window is greater than a first ratio threshold, and the first ratio threshold is greater than a specified ratio threshold.

In some embodiments, a ratio of the first candidate resource set to the third candidate resource set is greater than a first ratio threshold, or a ratio of the first candidate resource set to all resources within the resource selection window, and the first ratio threshold is greater than a specified ratio threshold.

In some embodiments, the first ratio threshold is preconfigured through a radio resource control signaling and corresponding to a ratio threshold set with an assistance resource assistance mechanism; the specified ratio threshold is corresponding to a ratio threshold preconfigured with a non-assistance resource assistance mechanism.

Figure 9:
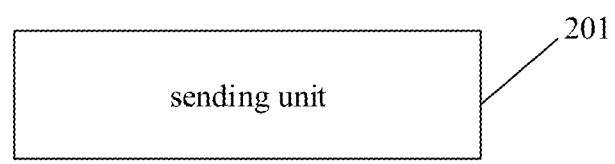
FIG. 9 is a block diagram of an apparatus for resource selection according to some embodiments.

FIG. 9 is a block diagram of an apparatus for resource selection according to some embodiments. Referring to FIG. 9, the apparatus 200 is applied to a first device and includes a sending unit 201.

The sending unit 201 is configured to send an assistance resource set, the assistance resource set including preferred resource set to be used by the first device or non-preferred resource set to be used by the first device.

With respect to the apparatuses in the above embodiments, the specific manners for performing operations for individual modules therein have been described in detail in the embodiments regarding the methods, which will not be elaborated herein.

Figure 10:
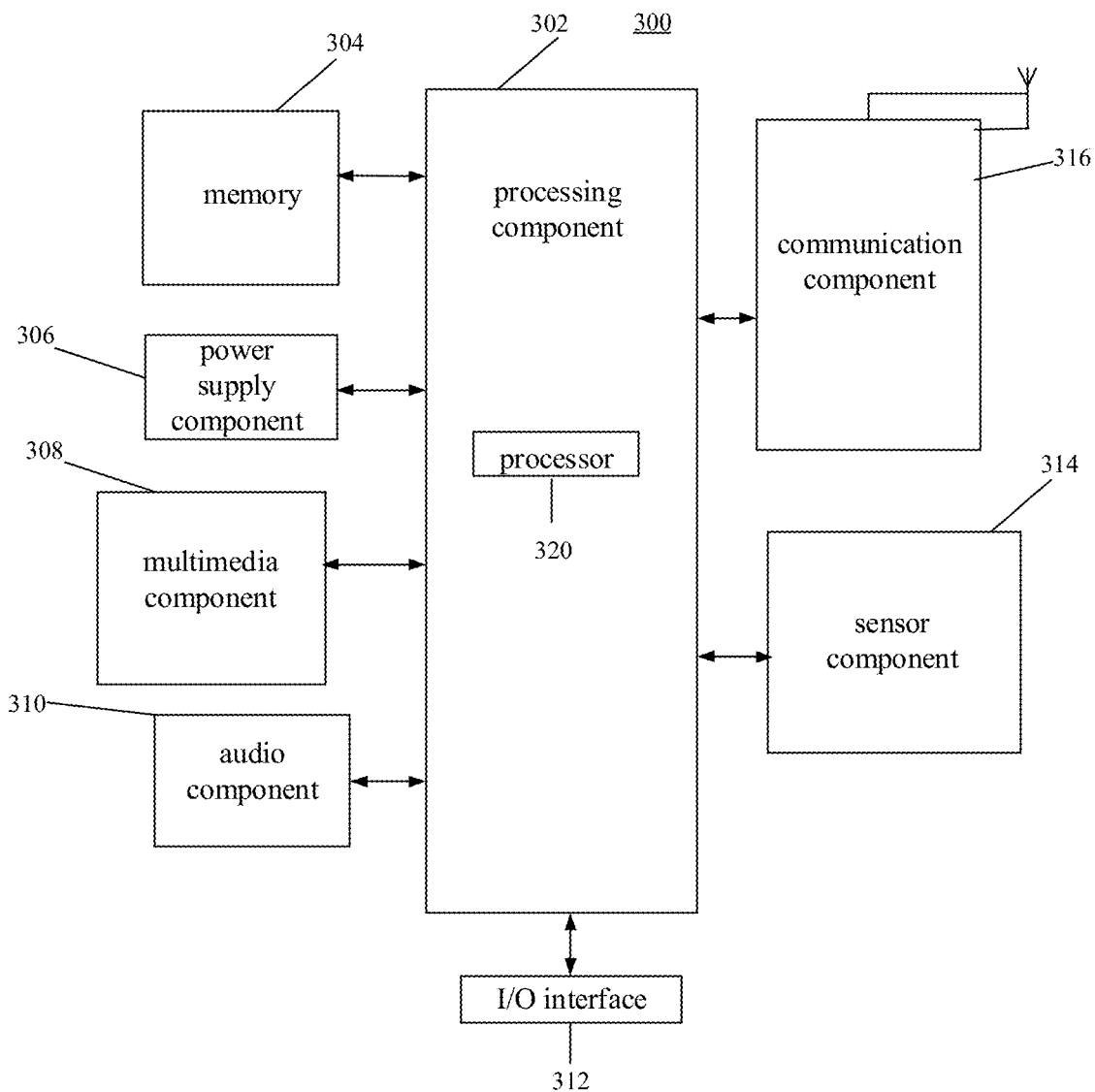
FIG. 10 is a block diagram of a device for resource selection according to some embodiments.

FIG. 10 is a block diagram illustrating a device 300 for resource selection according to some embodiments. For example, the device 300 may be a mobile phone, a computer, a digital broadcasting terminal, a messaging device, a game console, a tablet device, a medical device, a fitness equipment, a personal digital assistant, etc.

As illustrated in FIG. 10, the device 300 may include one or more components: a processing component 302, a memory 304, a power supply component 306, a multimedia component 308, an audio component 310, an input/output (I/O) interface 312, a sensor component 314, and a communication component 316.

The processing component 302 typically controls overall operations of the device 200, such as the operations associated with display, telephone calls, data communications, camera operations, and recording operations. The processing component 302 may include one or more processors 320 to execute instructions to perform all or part of the steps in the above described methods. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 306 may provide power to various components of the device 300. The power supply component 306 may include a power management system, one or more power sources, and any other components associated with the generation, management, and distribution of power in the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. The front camera and the rear camera may receive an external multimedia datum while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone ("MIC") configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as WiFi, 2G, or 3G, or a combination thereof. In one exemplary embodiment, the communication component 316 receives a broadcast signal or broadcast associated information from an external broadcast management system via a broadcast channel. In one exemplary embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer readable storage medium including instructions, such as included in the memory 304, executable by the processor 320 in the device 300, for performing the above-described methods. For example, the non-transitory computer-readable storage medium may be a ROM, a RAM, a CD-ROM, a magnetic tape, a floppy disc, an optical data storage device, and the like.

Figure 11:
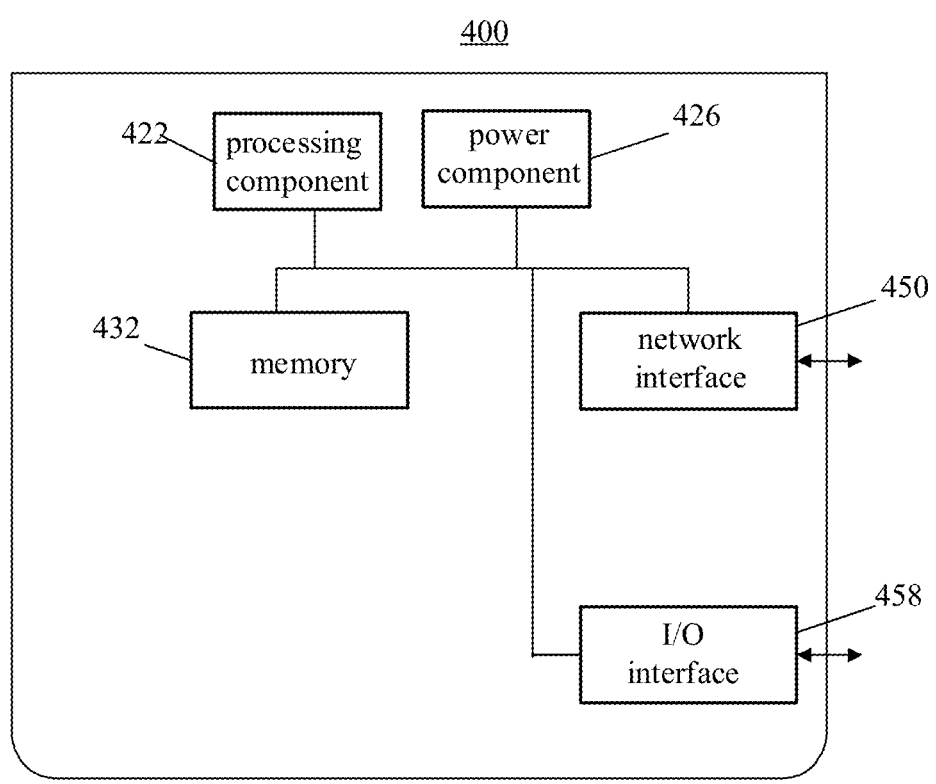
FIG. 11 is a block diagram of a device for resource selection according to some embodiments.

FIG. 11 is a block diagram illustrating a device 400 for resource selection according to some embodiments. For example, the device 400 is provided as the server. As illustrated in FIG. 11, the device 400 includes a processing component 422, which further includes one or more processors, and a memory resource represented by a memory 432 for storing instructions executable by the processing component 422, such as application programs. An application program stored in memory 432 may include one or more modules, each corresponding to a set of instructions. Additionally, the processing component 422 is configured to execute instructions to perform any of the aforementioned methods.

The device 400 may also include a power component 426 configured to perform power management of the device 400, a wired or wireless network interface 450 configured to connect the device 400 to a network, and an input output (I/O) interface 458. The device 400 may operate based on an operating system stored in the memory 432, such as Windows Server™, Mac OS X™, Unix™, Linux™, FreeBSD™ or the like.

In some embodiments, there is also provided a non-transitory computer readable storage medium including instructions, such as included in the memory 432, executable by the processor 422 in the device 400, for performing the above-described methods. For example, the non-transitory computer-readable storage medium may be a ROM, a RAM, a CD-ROM, a magnetic tape, a floppy disc, an optical data storage device, and the like.

It may be further understood that, "plurality" or "multiple" may refer to two or more. The term "and/or" may describe association relationships of associated objects, indicating that there may be three types of relationships, for example, A and/or B, which may mean: A exists alone, A and B exist at the same time, and B exists alone. The character "/" generally indicates that the associated objects before and after are in an "or" relationship.

It should be further understood that, although the terms "first", "second", etc. may be configured to describe various information, such information shall not be limited to these terms. These terms are only used to distinguish the same type of information, rather than indicate a particular order or importance degree. In fact, "first", "second" and other similar descriptions may be used interchangeably. For example, subject to the scope of this disclosure, first information may also be referred to as second information, and similarly, and second information may also be referred to as first information.

It may be further understood that, even though operations are described in the drawings in a particular order, it should not be understood as requiring that such operations be performed in the particular order shown or in sequential order, or that all illustrated operations be performed to obtain desirable results. In certain circumstances, multitasking and parallel processing may be advantageous.

Other embodiments of the disclosure will be apparent to those skilled in the art from consideration of the specification and practice of the disclosure disclosed here. This application is intended to cover any variations, uses, or adaptations of the invention following the general principles thereof and including such departures from the disclosure as come within known or customary practice in the art. It is intended that the specification and examples be considered as exemplary only, with a true scope and spirit of the disclosure being indicated by the following claims.

It should be understood that the disclosure is not limited to the precise structures described above and shown in the drawings, and various modifications and changes may be made without departing from its scope. The scope of the disclosure is only limited by the appended claims. The scope of the disclosure is only limited by the appended claims.

What is claimed is:

1. A method for resource selection, performed by a first device, the method comprising:
   determining an assistance resource set provided by a second device, the assistance resource set comprising a preferred resource set to be used by the first device or a non-preferred resource set to be used by the first device;
   in response to the assistance resource set comprising the preferred resources to be used by the first device, determining a third candidate resource set for transmission resource selection based on an intersection between a second candidate resource set and the assistance resource set;
   in response to the assistance resource set comprising the non-preferred resources to be used by the first device, determining a third candidate resource set for transmission resource selection based on a difference between a second candidate resource set and the assistance resource set;
   wherein the second candidate resource set comprises all resources within a resource selection window of the first device, and
   determining a first candidate resource set for transmission resource selection from the third candidate resource set.

2. The method as claimed in claim 1, further comprising: selecting a resource for transmitting data from the first candidate resource set.

3. The method as claimed in claim 1, further comprising:
   in response to the first candidate resource set being an empty set, selecting a transmission resource from the second candidate resource set or deselecting a transmission resource and abandoning a transmission of data.

4. The method as claimed in claim 1, wherein a ratio of the first candidate resource set to all resources within the resource selection window is greater than a first ratio threshold, and the first ratio threshold is greater than a specified ratio threshold;
   wherein the first ratio threshold is pre-configured through a radio resource control signaling and corresponding to a ratio threshold set with an assistance resource assistance mechanism;
   the specified ratio threshold is corresponding to a ratio threshold preconfigured with an non-assistance resource assistance mechanism.

5. The method as claimed in claim 1, wherein a ratio of the first candidate resource set to the third candidate resource set is greater than a first ratio threshold, or a ratio of the first candidate resource set to all resources within the resource selection window is greater than a first ratio threshold, and the first ratio threshold is greater than a specified ratio threshold.

6. A non-transitory computer-readable storage medium having stored therein instructions that, when executed by a processor of a first device, causes the first device to perform the method for resource selection as claimed in claim 1.

7. A method for resource selection, performed by a second device, the method comprising:
   sending an assistance resource set, the assistance resource set comprising a preferred resource set to be used by a first device or a non-preferred resource set to be used by the first device;
   wherein the assistance resource set is used for the first device to determine a third candidate resource set for transmission resource selection based on an intersection between a second candidate resource set and the assistance resource set in response to the assistance resource set comprising the preferred resources to be used by the first device; determine a third candidate resource set for transmission resource selection based on a difference between a second candidate resource set and the assistance resource set in response to the assistance resource set comprising the non-preferred resources to be used by the first device;
   wherein the second candidate resource set comprises all resources within a resource selection window of the first device, and a first candidate resource set for transmission resource selection is determined from the third candidate resource set.

8. A device for resource selection, comprising:
   a processor; and
   a memory for storing instructions executable by the processor;
   wherein the processor is configured to perform the method for resource selection as claimed in claim 7.

9. A non-transitory computer-readable storage medium having stored therein instructions that, when executed by a processor of a second device, causes the second device to perform the method for resource selection as claimed in claim 7.

10. A first device for resource selection, comprising:
    a processor; and
    a memory for storing instructions executable by the processor;
    wherein the processor is configured to:
    determine a set of assistance resources provided by a second device, the set of assistance resources comprising resources recommended to be used by the first device or resources not recommended to be used by the first device; and
    in response to the assistance resource set comprising the preferred resources to be used by the first device, determine a third set of candidate resources for transmission resource selection based on an intersection between a second candidate resource set and the assistance resource set;
    in response to the assistance resource set comprising the non-preferred resources to be used by the first device, determine a third candidate resource set for transmission resource selection based on a difference between a second candidate resource set and the assistance resource set;
    wherein the second candidate resource set comprises all resources within a resource selection window of the first device, and determine a first candidate resource set for transmission resource selection from the third candidate resource set.

* * * * *